(12) United States Patent
Pan et al.

(10) Patent No.: US 9,971,719 B2
(45) Date of Patent: May 15, 2018

(54) SYSTEM AND CIRCUIT USING USB TYPE-C INTERFACE

(71) Applicant: MEDIATEK Inc., Hsin-Chu (TW)

(72) Inventors: Ching-Gu Pan, Hsinchu (TW); Tsung-Han Wu, Yun-Lin Hsien (TW); Hsien-Sheng Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 178 days.

(21) Appl. No.: 14/849,653

(22) Filed: Sep. 10, 2015

(65) Prior Publication Data
US 2016/0156137 A1 Jun. 2, 2016

Related U.S. Application Data

(60) Provisional application No. 62/086,315, filed on Dec. 2, 2014.

(51) Int. Cl.
*G06F 13/38* (2006.01)
*G06F 13/40* (2006.01)
*G06F 13/42* (2006.01)

(52) U.S. Cl.
CPC ........ *G06F 13/385* (2013.01); *G06F 13/4022* (2013.01); *G06F 13/4282* (2013.01)

(58) Field of Classification Search
CPC .................................................. G06F 13/385
See application file for complete search history.

(56) References Cited

U.S. PATENT DOCUMENTS

| | | | | |
|---|---|---|---|---|
| 2011/0087806 | A1* | 4/2011 | Mohanty | G06F 13/385 710/16 |
| 2013/0212306 | A1 | 8/2013 | Liu | |
| 2013/0244491 | A1 | 9/2013 | Sarwar et al. | |
| 2013/0275629 | A1* | 10/2013 | Hall | G06F 13/385 710/14 |
| 2016/0110305 | A1* | 4/2016 | Hundal | G06F 13/4022 710/316 |

FOREIGN PATENT DOCUMENTS

| | | |
|---|---|---|
| CN | 202217161 U | 5/2012 |
| CN | 103617134 A | 3/2014 |

OTHER PUBLICATIONS

VESA DisplayPort Alt Mode for USB Type—C Standard Feature Summary; Sep. 22, 2014 VESA.org.*
EP Search Report dated May 18, 2016 in EP application (No. 15188103.4-1953).
"Proposed DisplayPort Alt Mode on USB Type-C Standard"; Version 1, Draft 3; Jul. 28, 2014; pp. 1-4.
CN Office Action dated Feb. 2, 2018 in Chinese application (No. 201510869530.4).

\* cited by examiner

*Primary Examiner* — Idriss N Alrobaye
*Assistant Examiner* — Ronald Modo
(74) *Attorney, Agent, or Firm* — McClure, Qualey & Rodack, LLP

(57) ABSTRACT

A system using a USB Type-C interface is provided. This system not only transmits the normal USB signal but also supports a DisplayPort Alternate Mode. Moreover, due to the novel pin arrangement of the multi-function control circuit, the cost of the overall system is reduced, and the area of the printed circuit board is effectively reduced.

11 Claims, 13 Drawing Sheets

US 9,971,719 B2

SYSTEM AND CIRCUIT USING USB TYPE-C INTERFACE

This application claims the benefit of U.S. provisional application Ser. No. 62/086,315, filed Dec. 2, 2014, the subject matter of which is incorporated herein by reference.

FIELD OF THE INVENTION

The invention relates to a system and a circuit using a USB interface, and more particularly to a system and a circuit using a USB Type-C interface.

BACKGROUND OF THE INVENTION

FIG. 1 schematically illustrates a USB Type-C interface 100. The USB Type-C interface 100 is a USB Type-C receptacle. The pins of the USB Type-C receptacle 100 comprise A group pins (A1~A12) and B group pins (B1~B12). The A1 pin, the A12 pin, the B1 pin and the B12 pin are ground voltage pins (GND); the A4 pin, the A9 pin, the B4 pin and the B9 pin are bus voltage pins (Vbus); the A2 pin and the A3 pin are a first transmitting differential pair (TX1+ and TX1); the B2 pin and the B3 pin are a second transmitting differential pair (TX2+ and TX2−); the B10 pin and the B11 pin are a first receiving differential pair (RX1+ and RX1−); the A10 pin and the A11 pin are a second receiving differential pair (RX2+ and RX2−); the A6 pin and the A7 pin are a USB 2.0 data differential pair (D+ and D−); the B6 pin and the B7 pin are also a USB 2.0 data differential pair (D+ and D−); the A5 pin and the B5 pin are configuration channel pins (CC1 and CC2); and the A8 and B8 are reserved pins (SBU1 and SBU2).

Moreover, the first transmitting differential pair (TX1+ and TX1), the second transmitting differential pair (TX2+ and TX2−), the first receiving differential pair (RX1+ and RX1−) and the second receiving differential pair (RX2+ and RX2−) are capable of carrying USB 3.1 differential signals.

As shown in FIG. 1, A group pins (A1~A12) and B group pins of the USB Type-C receptacle 100 are symmetrical. When a USB device is plugged into the USB Type-C receptacle 100 in an up orientation or a down orientation, the USB device can normally work. For example, when the USB device is plugged into the USB Type-C receptacle 100 in the up orientation, the USB device is connected with the A group pins, and the USB Type-C receptacle 100 is in communication with the USB device through the A group pins. On the other hand, when the USB device is plugged into the USB Type-C receptacle 100 in the down orientation, the USB device is connected with the B group pins, and the USB Type-C receptacle 100 is in communication with the USB device through the B group pins.

Furthermore, the USB Type-C interface can be used as the connection interface of other device such as a power device, a data device or a display device. For example, when the display device with PCIe interface is plugged into the USB Type-C receptacle, PCIe interface signals can be transmitted through the pins of the USB Type-C receptacle. This is the concept of PCIe over USB.

SUMMARY OF THE INVENTION

An object of the invention provides a system and a circuit using a USB Type-C interface. This system not only transmits the normal USB signal but also supports a DisplayPort Alternate Mode. In the DisplayPort Alternate Mode, the USB Type-C interface provides the pins of the DisplayPort.

The invention provides a system using a USB Type-C interface. The system includes a multi-function control circuit and a USB Type-C receptacle. The multi-function control circuit is mounted on a printed circuit board, and includes a USB controller and a graphics processing unit. The USB controller includes a data differential pair, a first transmitting differential pair, a second transmitting differential pair, a first receiving differential pair and a second receiving differential pair. The data differential pair is connected with a first pin and a second pin of the multi-function control circuit. The first transmitting differential pair is connected with a third pin and a fourth pin of the multi-function control circuit. The second transmitting differential pair is connected with a fifth pin and a sixth pin of the multi-function control circuit. The first receiving differential pair is connected with a seventh pin and an eighth pin of the multi-function control circuit. The second receiving differential pair is connected with a ninth pin and a tenth pin of the multi-function control circuit. The graphics processing unit includes a first lane differential pair, a second lane differential pair, a third lane differential pair, a fourth lane differential pair and an auxiliary differential pair. The first lane differential pair is connected with the third pin and the fourth pin of the multi-function control circuit. The second lane differential pair is connected with the fifth pin and the sixth pin of the multi-function control circuit. The third lane differential pair is connected with the seventh pin and the eighth pin of the multi-function control circuit. The fourth lane differential pair is connected with the ninth pin and the ten pin of the multi-function control circuit. The auxiliary differential pair is connected with an eleventh pin and a twelfth pin of the multi-function control circuit. The USB Type-C receptacle is mounted on a printed circuit board, and includes plural pins. An A1 pin is connected with a ground voltage, an A2 pin is coupled with the third pin through a first capacitor, an A3 pin is coupled with the fourth pin through a second capacitor, an A4 pin is connected with a bus voltage, an A6 pin is connected with the first pin, an A7 pin is connected with the second pin, an A9 pin is connected with the bus voltage, an A10 pin is coupled with the tenth pin through a third capacitor, an A11 pin is coupled with the ninth pin through a fourth capacitor, an A12 pin is connected with the ground voltage. A B1 pin is connected with the ground voltage, a B2 pin is coupled with the fifth pin through a fifth capacitor, a B3 pin is coupled with the sixth pin through a sixth capacitor, a B4 pin is connected with the bus voltage, a B6 pin is connected with the first pin, a B7 pin is connected with the second pin, a B9 pin is connected with the bus voltage, a B10 pin is connected with the eighth pin through a seventh capacitor, a B11 pin is connected with the seventh pin through an eighth capacitor, and a B12 pin is connected with the ground voltage. Moreover, an A8 pin is connected with the eleventh pin, a B8 pin is connected with the twelfth pin, one of an A5 pin and a B5 pin provides a configuration channel signal, and the other one of the A5 pin and the B5 pin receives a connection voltage.

The invention further provides a multi-function control circuit. The multi-function control circuit includes a USB controller and a graphics processing unit. The USB controller includes a data differential pair, a first transmitting differential pair, a second transmitting differential pair, a first receiving differential pair and a second receiving differential pair. The data differential pair is connected with a first pin and a second pin of the multi-function control circuit. The first transmitting differential pair is connected with a third pin and a fourth pin of the multi-function control circuit. The second transmitting differential pair is connected with a fifth pin and a sixth pin of the multi-function control circuit. The first receiving differential pair is connected with a seventh pin and an eighth pin of the multi-function control circuit. The second receiving differential pair is connected with a ninth pin and a tenth pin of the multi-function control circuit. The graphics processing unit includes a first lane differential pair, a second lane differential pair, a third lane differential pair, a fourth lane differential pair and an auxiliary differential pair. The first lane differential pair is connected with the third pin and the fourth pin of the multi-function control circuit. The second lane differential pair is connected with the fifth pin and the sixth pin of the multi-function control circuit. The third lane differential pair is connected with the seventh pin and the eighth pin of the multi-function control circuit. The fourth lane differential pair is connected with the ninth pin and the ten pin of the multi-function control circuit. The auxiliary differential pair is connected with an eleventh pin and a twelfth pin of the multi-function control circuit.

The invention further provides a system using a USB Type-C interface. The system includes a multi-function control circuit, a first path switching circuit, a second path switching circuit and a USB Type-C receptacle. The multi-function control circuit is mounted on a printed circuit board, and includes a USB controller and a graphics processing unit. The USB controller includes a data differential pair, a first transmitting differential pair, a second transmitting differential pair, a first receiving differential pair and a second receiving differential pair. The data differential pair is connected with a first pin and a second pin of the multi-function control circuit. The first transmitting differential pair is connected with a third pin and a fourth pin of the multi-function control circuit. The second transmitting differential pair is connected with a fifth pin and a sixth pin of the multi-function control circuit. The first receiving differential pair is connected with a seventh pin and an eighth pin of the multi-function control circuit. The second receiving differential pair is connected with a ninth pin and a tenth pin of the multi-function control circuit. The graphics processing unit includes a first lane differential pair, a second lane differential pair, a third lane differential pair, a fourth lane differential pair and an auxiliary differential pair. The first lane differential pair is connected with an eleventh pin and a twelfth pin of the multi-function control circuit. The second lane differential pair is connected with a thirteenth pin and a fourteenth pin of the multi-function control circuit. The third lane differential pair is connected with the third pin and the fourth pin of the multi-function control circuit. The fourth lane differential pair is connected with the fifth pin and the sixth pin of the multi-function control circuit. The auxiliary differential pair is connected with a fifteenth pin and a sixteenth pin of the multi-function control circuit. The first path switching circuit is connected with the seventh pin and the eighth pin, and coupled with the eleventh pin and the twelfth pin through a first capacitor and a second capacitor. The second path switching circuit is connected with the ninth pin and the tenth pin, and coupled with the thirteenth pin and the fourteenth pin through a third capacitor and a fourth capacitor. The USB Type-C receptacle is mounted on a printed circuit board, and comprising plural pins. An A1 pin is connected with a ground voltage, an A2 pin is coupled with the third pin through a fifth capacitor, an A3 pin is coupled with the fourth pin through a sixth capacitor, an A4 pin is connected with a bus voltage, an A6 pin is connected with the first pin, an A7 pin is connected with the second pin, an A9 pin is connected with the bus voltage, an A10 pin and an A11 pin are connected with the second path switching circuit, and A12 pin is connected with the ground voltage. A B1 pin is connected with the ground voltage, a B2 pin is coupled with the fifth pin through a seventh capacitor, a B3 pin is coupled with the sixth pin through an eighth capacitor, a B4 pin is connected with the bus voltage, a B6 pin is connected with the first pin, a B7 pin is connected with the second pin, a B9 pin is connected with the bus voltage, a B10 pin and a B11 pin is connected with the first path switching circuit, and a B12 pin is connected with the ground voltage. Moreover, an A8 pin is connected with the fifteenth pin, a B8 pin is connected with the sixteenth pin, one of an A5 pin and a B5 pin provides a configuration channel signal, and the other one of the A5 pin and the B5 pin receives a connection voltage.

The invention further provides a multi-function control circuit. The multi-function control circuit includes a USB controller and a graphics processing unit. The USB controller includes a data differential pair, a first transmitting differential pair, a second transmitting differential pair, a first receiving differential pair and a second receiving differential pair. The data differential pair is connected with a first pin and a second pin of the multi-function control circuit. The first transmitting differential pair is connected with a third pin and a fourth pin of the multi-function control circuit. The second transmitting differential pair is connected with a fifth pin and a sixth pin of the multi-function control circuit. The first receiving differential pair is connected with a seventh pin and an eighth pin of the multi-function control circuit. The second receiving differential pair is connected with a ninth pin and a tenth pin of the multi-function control circuit. The graphics processing unit includes a first lane differential pair, a second lane differential pair, a third lane differential pair, a fourth lane differential pair and an auxiliary differential pair. The first lane differential pair is connected with an eleventh pin and a twelfth pin of the multi-function control circuit. The second lane differential pair is connected with a thirteenth pin and a fourteenth pin of the multi-function control circuit. The third lane differential pair is connected with the third pin and the fourth pin of the multi-function control circuit. The fourth lane differential pair is connected with the fifth pin and the sixth pin of the multi-function control circuit. The auxiliary differential pair is connected with a fifteenth pin and a sixteenth pin of the multi-function control circuit.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

As mentioned above, the USB Type-C interface can be used as the connection interface of other device. Therefore, the invention provides a system using a USB Type-C interface. The system supports a DisplayPort Alternate Mode. That is, a display device can receive DisplayPort AV signals through the USB Type-C interface.

Figure 1:
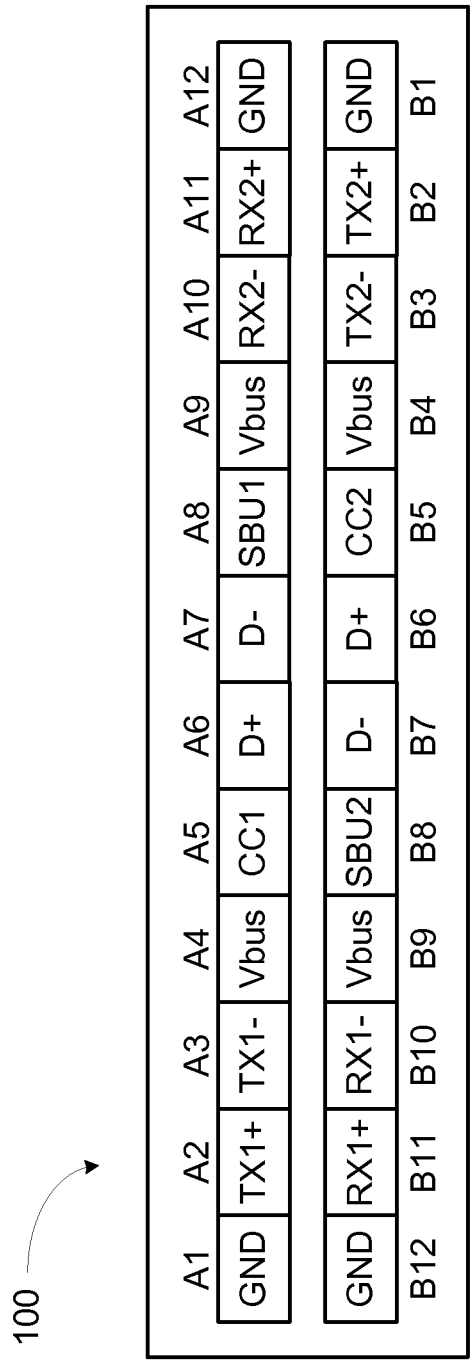
FIG. 1 (prior art) schematically illustrates a USB Type-C interface.
Figure 2A:
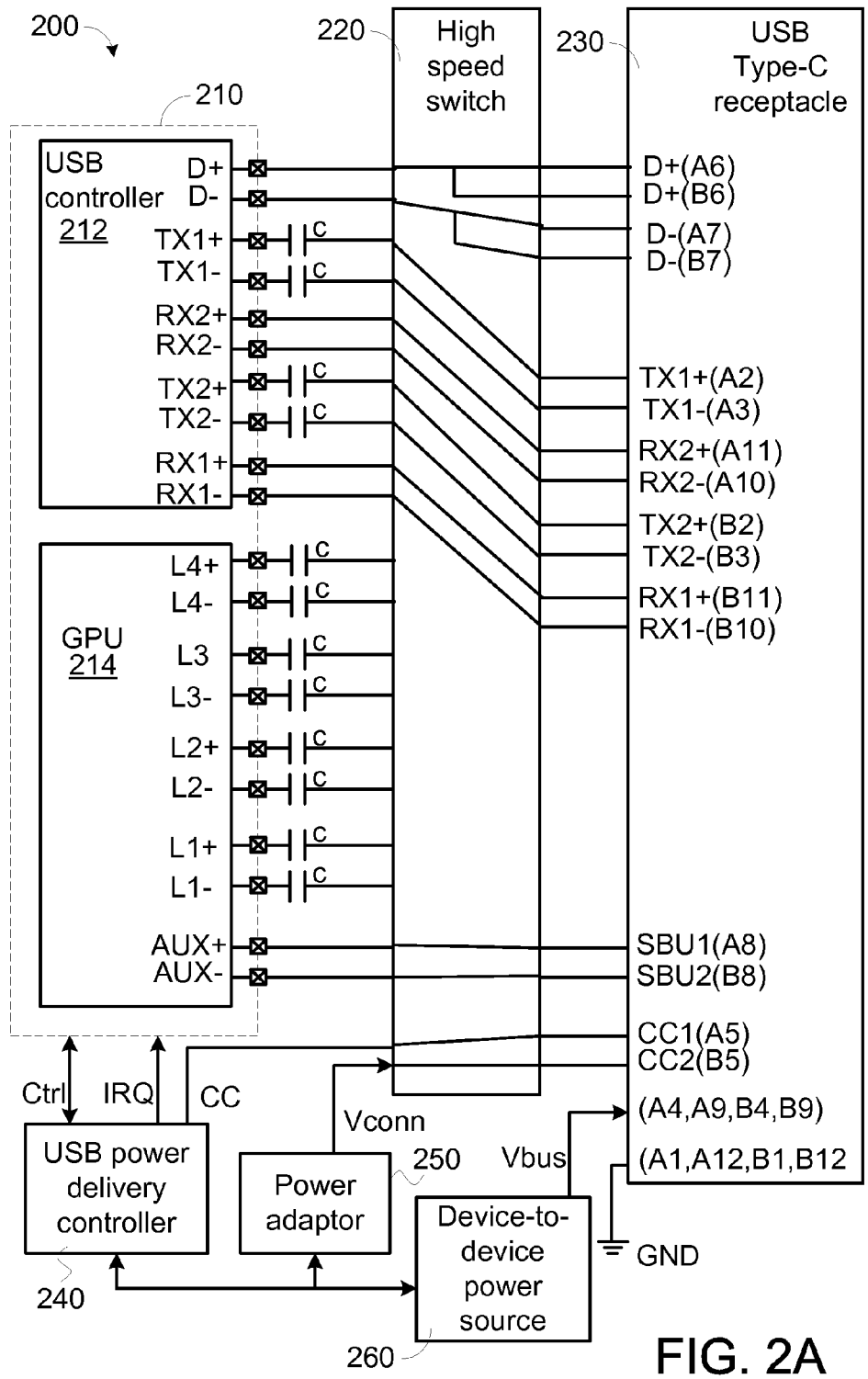
FIGS. 2A, 2B and 2C schematically illustrate the architecture of a first system using a USB Type-C interface in different operation modes according to an embodiment of the invention.
Figure 2B:
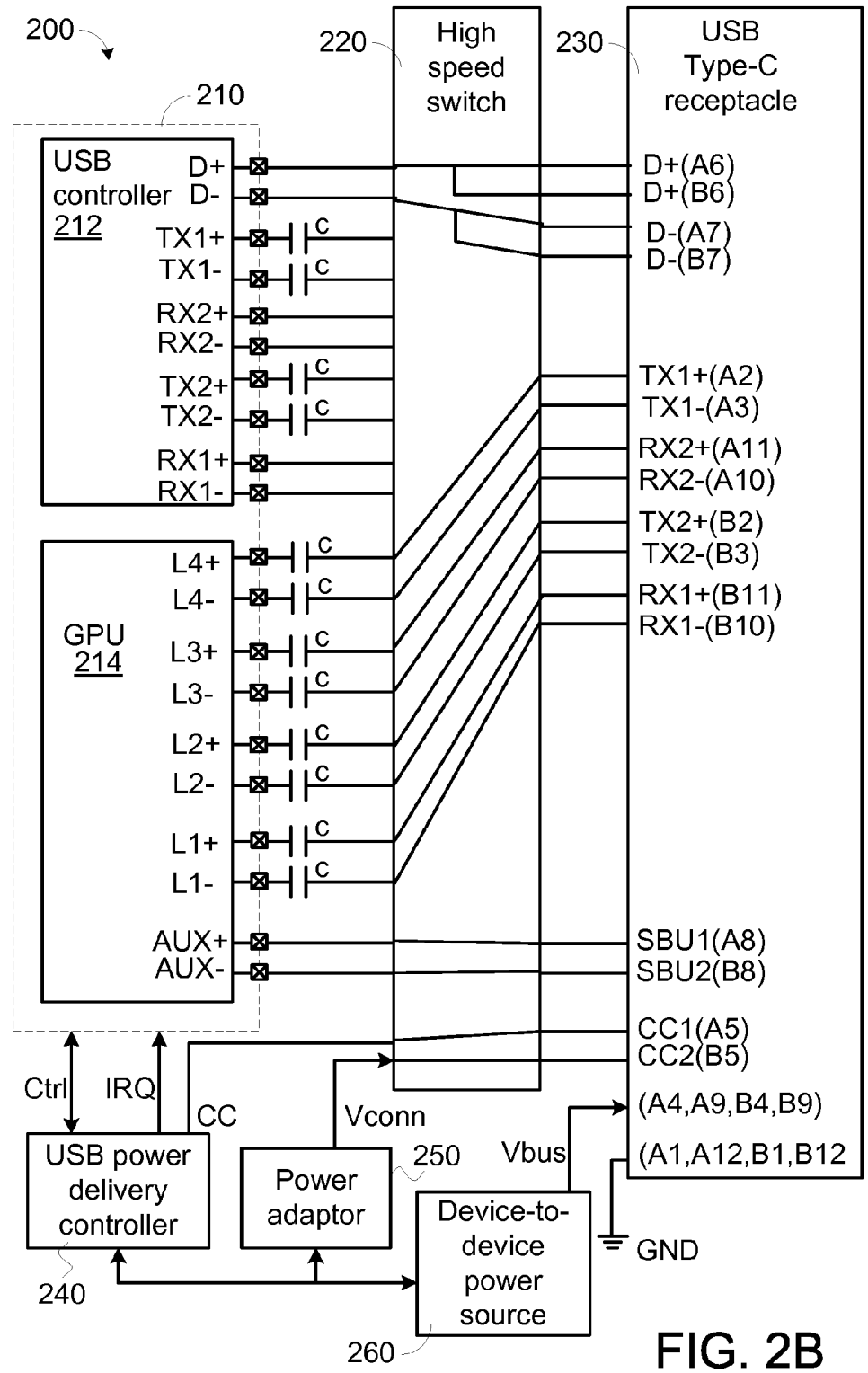
Figure 2C:
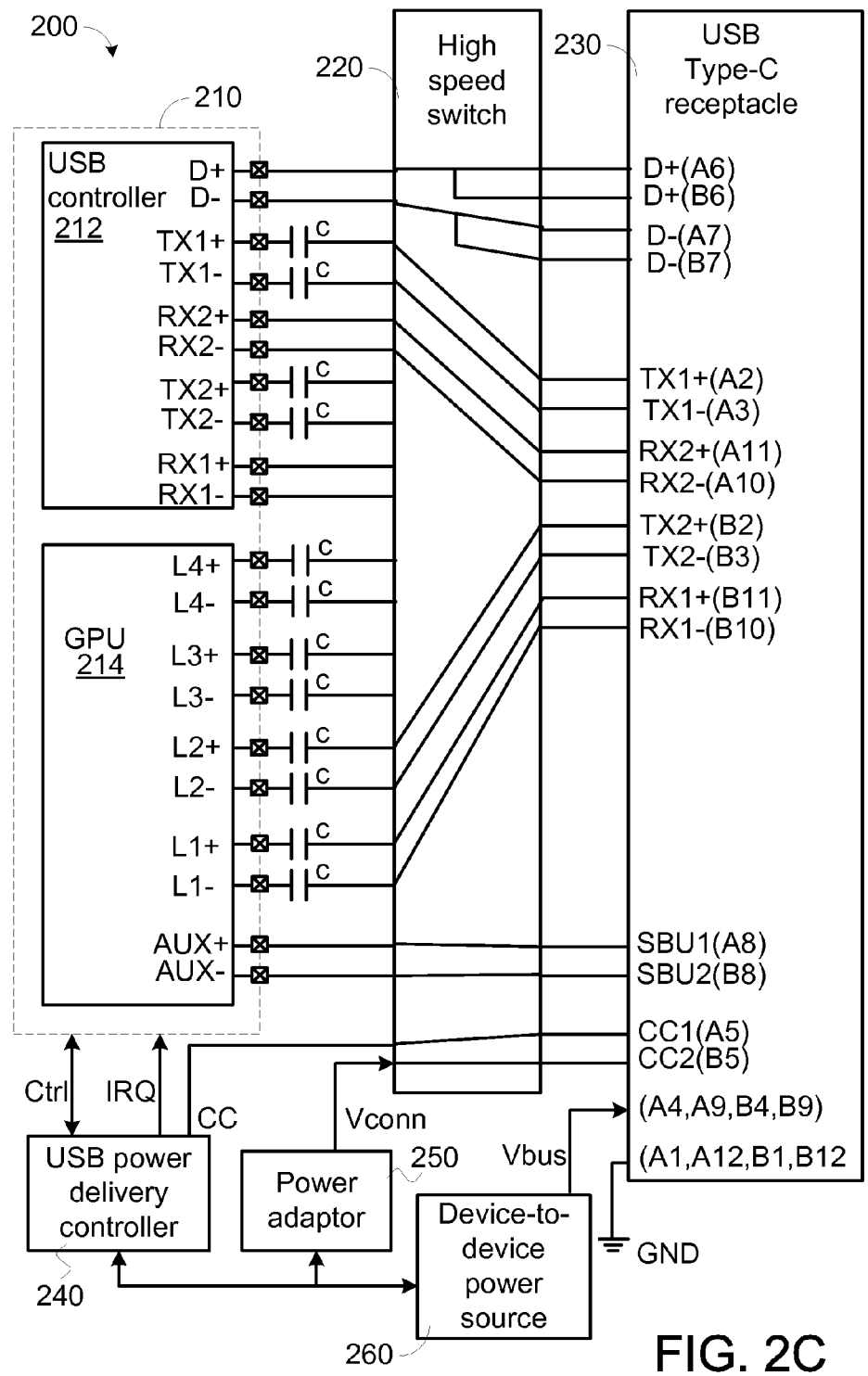

FIGS. 2A, 2B and 2C schematically illustrate the architecture of a first system 200 using a USB Type-C interface in different operation modes according to an embodiment of the invention. The first system 200 is mounted on a printed circuit board (PCB). Moreover, the first system 200 comprises a multi-function control circuit 210, a high speed switch 220, a USB Type-C receptacle 230, a USB power delivery controller 240, a power adaptor 250, a device-to-device power source 260 and plural capacitors c.

A2~A3, A5~A8, A10~A11, B2~B3, B5~B8 and B10~B11 pins of the USB Type-C receptacle 230 are connected with the high speed switch 220. A4, A9, B4 and B9 of the USB Type-C receptacle 230 receive a bus voltage Vbus. A1, A12, B1 and B12 pins receives a ground voltage GND.

The multi-function control circuit 210 comprises a USB controller 212 and a graphics processing unit (GPU) 214. The USB controller 212 comprises a first transmitting differential pair (TX1+ and TX1), a second transmitting differential pair (TX2+ and TX2−), a first receiving differential pair (RX1+ and RX1−), a second receiving differential pair (RX2+ and RX2−) and a USB 2.0 data differential pair (D+ and D−). The graphics processing unit 214 comprises an auxiliary differential pair (AUX+ and AUX−) and four lanes, including four lane differential pairs (L1+ and L1−, L2+ and L2−, L3+ and L3− and L4+ and L4−) for outputting DisplayPort AV signals.

According to the specifications, the pin corresponding to the single directional output signal has to be serially connected with the 100 nF capacitor c, and the pin corresponding to the single directional input signal and the pin corresponding to the bidirectional signal do not need to be serially connected with the capacitors. Consequently, as shown in FIG. 2A, the first transmitting differential pair (TX1+ and TX1) and the second transmitting differential pair (TX2+ and TX2−) of the USB controller 212 and the four lane differential pairs (L1+ and L1−, L2+ and L2−, L3+ and L3− and L4+ and L4−) of the graphics processing unit 214 are coupled with the high speed switch 220 through corresponding capacitors c. Moreover, the first receiving differential pair (RX1+ and RX1−), the second receiving differential pair (RX2+ and RX2−) and the USB 2.0 data differential pair (D+ and D−) of the USB controller 212 and the auxiliary differential pair (AUX+ and AUX−) of the graphics processing unit 214 are directly connected with the high speed switch 220.

The power adapter 250 is connected with the high speed switch 220 and connected with one of the A5 pin and the B5 pin of the USB Type-C receptacle 230, e.g. the B5 pin. The USB power delivery controller 240 is connected with the high speed switch 220 and connected with the other one of the A5 pin and the B5 pin of the USB Type-C receptacle 230, e.g. the A5 pin. Generally, after a USB device or a display device is plugged into the USB Type-C receptacle 230, one of the A5 pin and the B5 pin outputs a configuration channel signal CC, and the other one of the A5 pin and the B5 pin receives a connection voltage Vconn. Through the switching path of the high speed switch 220, the configuration channel signal CC is transmitted to the USB power delivery controller 240, and the connection voltage Vconn is transmitted to the USB Type-C receptacle 230. Moreover, according to the configuration channel signal CC, the first system 200 can realize whether the plugged device is plugged into the USB Type-C receptacle 230 in an up orientation or a down orientation and further realize whether the plugged device is a USB device or a display device.

The USB power delivery controller 240 is connected with the multi-function control circuit 210 and the power adapter 250. After the device plugged into the USB Type-C receptacle 230 is realized, the USB power delivery controller 240 will control the high speed switch 220 to adjust the switching path. Moreover, the device-to-device power source 260 is connected with the USB power delivery controller 240. The device-to-device power source 260 generates a bus voltage Vbus to the USB Type-C receptacle 230.

FIG. 2A schematically illustrates the architecture of the first system 200 in a first operation mode according to an embodiment of the invention. For example, a USB device is plugged into the USB Type-C receptacle 230. After the first system 200 realizes that the USB device is plugged into the USB Type-C receptacle 230 according to the configuration channel signal CC, the switching path of the high speed switch 220 is adjusted to the USB controller 212. Under this circumstance, the first transmitting differential pair (TX1+ and TX1) of the USB controller 212 is coupled with the USB Type-C receptacle 230 through the corresponding capacitors c; the second transmitting differential pair (TX2+ and TX2−) of the USB controller 212 is coupled with the USB Type-C receptacle 230 through the corresponding capacitors c; the first receiving differential pair (RX1+ and RX1−) of the USB controller 212 is directly connected with the USB Type-C receptacle 230; and the second receiving differential pair (RX2+ and RX2−) of the USB controller 212 is directly connected with the USB Type-C receptacle 230.

FIG. 2B schematically illustrates the architecture of the first system 200 in a second operation mode according to an embodiment of the invention. For example, a display device is plugged into the USB Type-C receptacle 230. According to the configuration channel signal CC, the first system 200 realizes that the display device is plugged into the USB Type-C receptacle 230. If all lanes need to be used, the switching path of the high speed switch 220 is adjusted to the graphics processing unit 214. Under this circumstance, the B11 pin and the B10 pin of the USB Type-C receptacle 230 are coupled with the first lane differential pair (L1+ and L1−) of the graphics processing unit 214 through the corresponding capacitors c; the B2 pin and the B3 pin of the USB Type-C receptacle 230 are coupled with the second lane differential pair (L2+ and L2−) of the graphics processing unit 214 through the corresponding capacitors c; the A11 pin and the A10 pin of the USB Type-C receptacle 230 are coupled with the third lane differential pair (L3+ and L3−) of the graphics processing unit 214 through the corresponding capacitors c; and the A2 pin and the A3 pin of the USB Type-C receptacle 230 are coupled with the fourth lane differential pair (L4+ and L4−) of the graphics processing unit 214 through the corresponding capacitors c. Moreover, the A8 pin and the B8 pin of the USB Type-C receptacle 230 are connected with the auxiliary differential pair (AUX+ and AUX−) of the graphics processing unit 214. Consequently, the DisplayPort AV signals are outputted to the display device through the four lanes of the graphics processing unit 214.

FIG. 2C schematically illustrates the architecture of the first system 200 in a third operation mode according to an embodiment of the invention. For example, a display device is plugged into the USB Type-C receptacle 230. According to the configuration channel signal CC, the first system 200 realizes that the display device is plugged into the USB Type-C receptacle 230. If only portions of the lanes need to be used, the switching path of the high speed switch 220 is adjusted to the USB controller 212 and the graphics processing unit 214. Under this circumstance, the A2 pin and the A3 pin of the USB Type-C receptacle 230 are coupled with the first transmitting differential pair (TX1+ and TX1) of the USB controller 212 through the corresponding capacitors; the A11 pin and the A10 pin of the USB Type-C receptacle 230 are coupled with the second receiving differential pair (RX2+ and RX2−) of the USB controller 212; the B11 pin and the B10 pin of the USB Type-C receptacle 230 are coupled with the first lane differential pair (L1+ and L1−) of the graphics processing unit 214 through the corresponding capacitors c; and the B2 pin and the B3 pin of the USB Type-C receptacle 230 are coupled with the second lane differential pair (L2+ and L2−) of the graphics processing unit 214 through the corresponding capacitors c. Moreover, the A8 pin and the B8 pin of the USB Type-C receptacle 230 are connected with the auxiliary differential pair (AUX+ and AUX−) of the graphics processing unit 214.

Consequently, the DisplayPort AV signals are outputted to the display device through the two lanes of the graphics processing unit 214. Moreover, the display device is in communication with the USB controller 212 through the first transmitting differential pair (TX1+ and TX1) and the second transmitting differential pair (TX2+ and TX2−).

In the first system 200 of FIG. 2A, 2B or 2C, the multi-function control circuit 210 on the printed circuit board has at least twenty pins for inputting and outputting signals. Moreover, the high speed switch 220 is required to provide the switching path. Consequently, the cost of the first system 200 is relatively higher. By modifying the internal connecting relationships of the multi-function control circuit 210, the cost of the overall system can be effectively reduced.

FIGS. 3A, 3B, 3C and 3D schematically illustrate the architecture of a second system 300 using a USB Type-C interface in different operation modes according to an embodiment of the invention. The second system 300 is mounted on a printed circuit board (PCB). The second system 300 comprises a multi-function control circuit 310, a USB Type-C receptacle 230, a USB power delivery controller 340, a power adaptor 350, a device-to-device power source 360, a configuration channel logic circuit (CC logic circuit) 370 and plural capacitors c.

The A6 pin and the B6 pin of the USB Type-C receptacle 230 are connected with a first pin 1 of the multi-function control circuit 310. The A7 pin and the B7 pin of the USB Type-C receptacle 230 are connected with a second pin 2 of the multi-function control circuit 310. The A2 pin of the USB Type-C receptacle 230 is connected with a third pin 3 of the multi-function control circuit 310 through the corresponding capacitor c. The A3 pin of the USB Type-C receptacle 230 is connected with a fourth pin 4 of the multi-function control circuit 310 through the corresponding capacitor c. The A11 pin of the USB Type-C receptacle 230 is connected with a ninth pin 9 of the multi-function control circuit 310 through the corresponding capacitor c. The A10 pin of the USB Type-C receptacle 230 is connected with a tenth pin 10 of the multi-function control circuit 310 through the corresponding capacitor c. The B2 pin of the USB Type-C receptacle 230 is connected with a fifth pin 5 of the multi-function control circuit 310 through the corresponding capacitor c. The B3 pin of the USB Type-C receptacle 230 is connected with a sixth pin 6 of the multi-function control circuit 310 through the corresponding capacitor c. The B11 pin of the USB Type-C receptacle 230 is connected with a seventh pin 7 of the multi-function control circuit 310 through the corresponding capacitor c. The B10 pin of the USB Type-C receptacle 230 is connected with an eighth pin 8 of the multi-function control circuit 310 through the corresponding capacitor c. The A8 pin of the USB Type-C receptacle 230 is connected with an eleventh pin 11 of the multi-function control circuit 310. The B8 pin of the USB Type-C receptacle 230 is connected with a twelfth pin 12 of the multi-function control circuit 310.

The multi-function control circuit 310 comprises a USB controller 312 and a graphics processing unit (GPU) 314. The USB controller 312 comprises a USB 2.0 data differential pair (D+ and D−), a first transmitting differential pair (TX1+ and TX1), a second transmitting differential pair (TX2+ and TX2−), a first receiving differential pair (RX1+ and RX1−) and a second receiving differential pair (RX2+ and RX2−). The USB 2.0 data differential pair (D+ and D−) is connected with the first pin 1 and the second pin 2. The first transmitting differential pair (TX1+ and TX1) is connected with the third pin 3 and the fourth pin 4. The second transmitting differential pair (TX2+ and TX2−) is connected with the fifth pin 5 and the sixth pin 6. The first receiving differential pair (RX1+ and RX1−) is connected with the seventh pin 7 and the eighth pin 8. The second receiving differential pair (RX2+ and RX2−) is connected with the ninth pin 9 and the tenth pin 10.

The graphics processing unit 314 comprises an auxiliary differential pair (AUX+ and AUX−) and four lanes, including four lane differential pairs (L1+ and L1−, L2+ and L2−, L3+ and L3− and L4+ and L4−) for outputting DisplayPort AV signals. The first lane differential pair (L1+ and L1−) is connected with the third pin 3 and the fourth pin 4. The second lane differential pair (L2+ and L2−) is connected with the fifth pin 5 and the sixth pin 6. The third lane differential pair (L3+ and L3−) is connected with the seventh pin 7 and the eighth pin 8. The fourth lane differential pair (L4+ and L4−) is connected with the ninth pin 9 and the tenth pin 10. The auxiliary differential pair (AUX+ and AUX−) is connected with the eleventh pin 11 and the twelfth pin 12.

The power adapter 350 is connected with one of the A5 pin and the B5 pin of the USB Type-C receptacle 230 (e.g., the B5 pin) through the configuration channel logic circuit 370. The USB power delivery controller 340 is connected with the other one of the A5 pin and the B5 pin of the USB Type-C receptacle 230 (e.g., the A5 pin) through the configuration channel logic circuit 370. Generally, after a USB device or a display device is plugged into the USB Type-C receptacle 230, one of the A5 pin and the B5 pin acts as configuration channel signal CC, and the other one of the A5 pin and the B5 pin will be used for Vconn voltage. Through the switching path of the configuration channel logic circuit 370, the configuration channel signal CC is transmitted to the USB power delivery controller 340, and the connection voltage Vconn is transmitted to the USB Type-C receptacle 230. Moreover, according to the configuration channel signal CC, the second system 300 can realize whether the plugged device is plugged into the USB Type-C receptacle 230 in an up orientation or a down orientation and further realize whether the plugged device is a USB device or a display device.

The USB power delivery controller 340 is connected with the multi-function control circuit 310 and the power adapter 350. The device-to-device power source 260 generates a bus voltage Vbus to the USB Type-C receptacle 230.

Figure 3A:
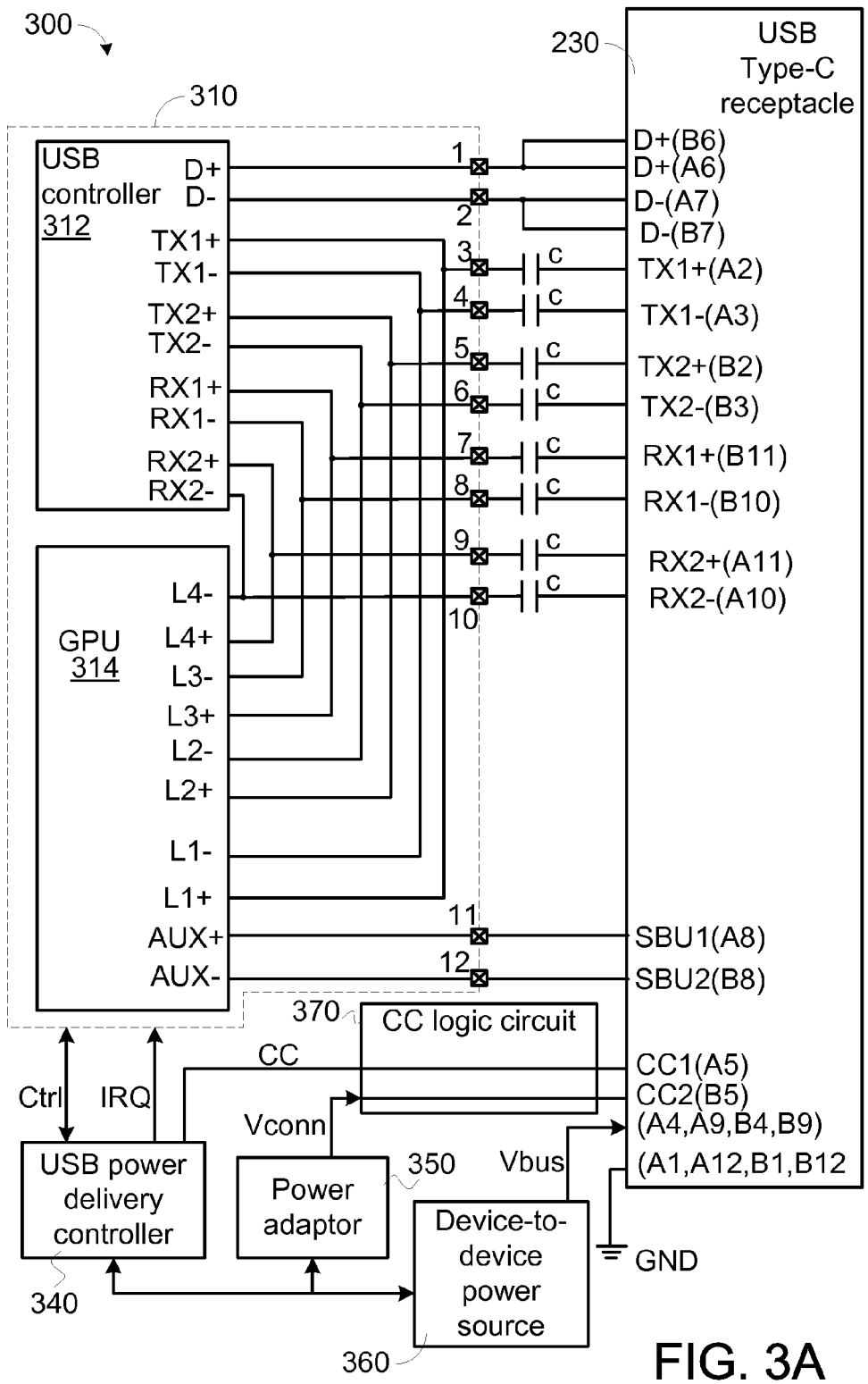
FIGS. 3A, 3B, 3C and 3D schematically illustrate the architecture of a second system using a USB Type-C interface in different operation modes according to an embodiment of the invention.
Figure 3B:
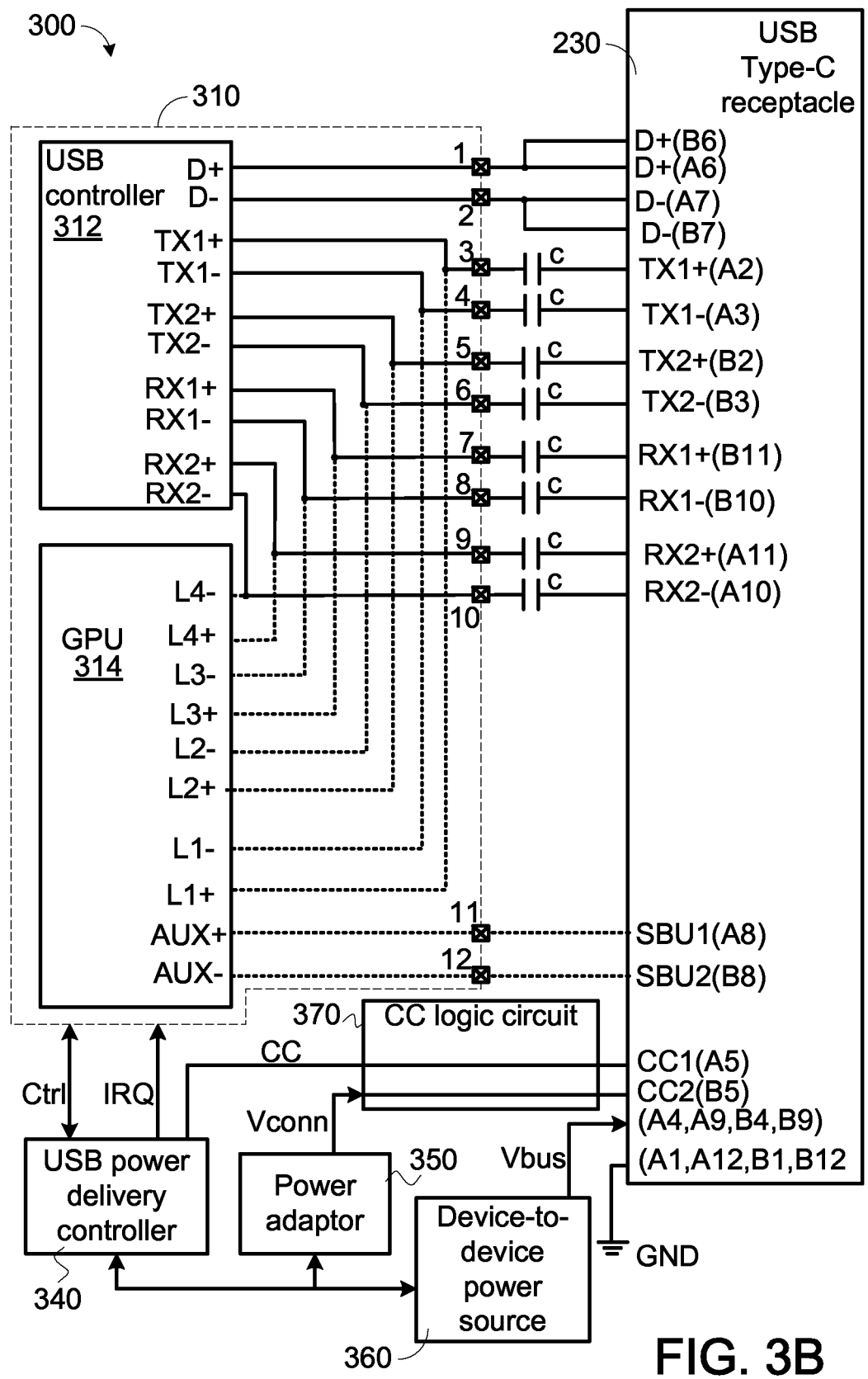

FIG. 3B schematically illustrates the architecture of the second system 300 in a first operation mode according to an embodiment of the invention. For example, a USB device is plugged into the USB Type-C receptacle 230. After the second system 300 realizes that the USB device is plugged into the USB Type-C receptacle 230 according to the configuration channel signal CC, the graphics processing unit 314 does not generate any output signal. Under this circumstance, the first transmitting differential pair (TX1+ and TX1) of the USB controller 312 is coupled with the USB Type-C receptacle 230 through the corresponding capacitors c; the second transmitting differential pair (TX2+ and TX2−) of the USB controller 312 is coupled with the USB Type-C receptacle 230 through the corresponding capacitors c; the first receiving differential pair (RX1+ and RX1−) of the USB controller 312 is directly connected with the USB Type-C receptacle 230; and the second receiving differential pair (RX2+ and RX2−) of the USB controller 312 is directly connected with the USB Type-C receptacle 230. Consequently, the USB device can receive all signals from the USB controller 312.

Figure 3C:
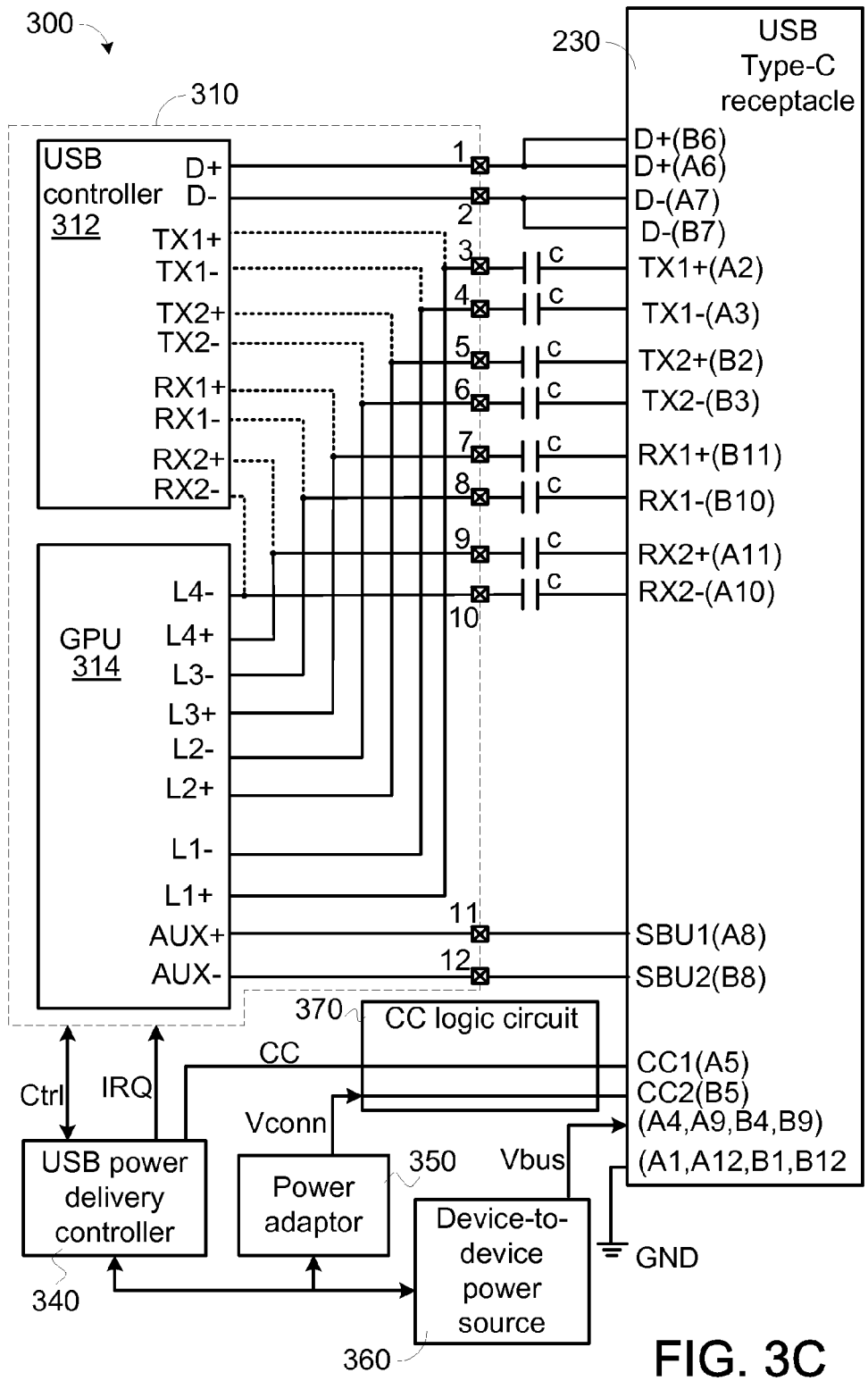

FIG. 3C schematically illustrates the architecture of the second system 300 in a second operation mode according to an embodiment of the invention. For example, a display device is plugged into the USB Type-C receptacle 230. According to the configuration channel signal CC, the second system 300 realizes that the display device is plugged into the USB Type-C receptacle 230. If all lanes need to be used, the USB controller 312 does not generate any output signal. Under this circumstance, the A2 pin and the A3 pin of the USB Type-C receptacle 230 are coupled with the first lane differential pair (L1+ and L1−) of the graphics processing unit 314 through the corresponding capacitors c; the B2 pin and the B3 pin of the USB Type-C receptacle 230 are coupled with the second lane differential pair (L2+ and L2−) of the graphics processing unit 314 through the corresponding capacitors c; the B11 pin and the B10 pin of the USB Type-C receptacle 230 are coupled with the third lane differential pair (L3+ and L3−) of the graphics processing unit 314 through the corresponding capacitors c; and the A11 pin and the A10 pin of the USB Type-C receptacle 230 are coupled with the fourth lane differential pair (L4+ and L4−) of the graphics processing unit 314 through the corresponding capacitors c. Moreover, the A8 pin and the B8 pin of the USB Type-C receptacle 230 are connected with the auxiliary differential pair (AUX+ and AUX−) of the graphics processing unit 314. Consequently, the DisplayPort AV signals are outputted to the display device through the four lanes of the graphics processing unit 314.

Figure 3D:
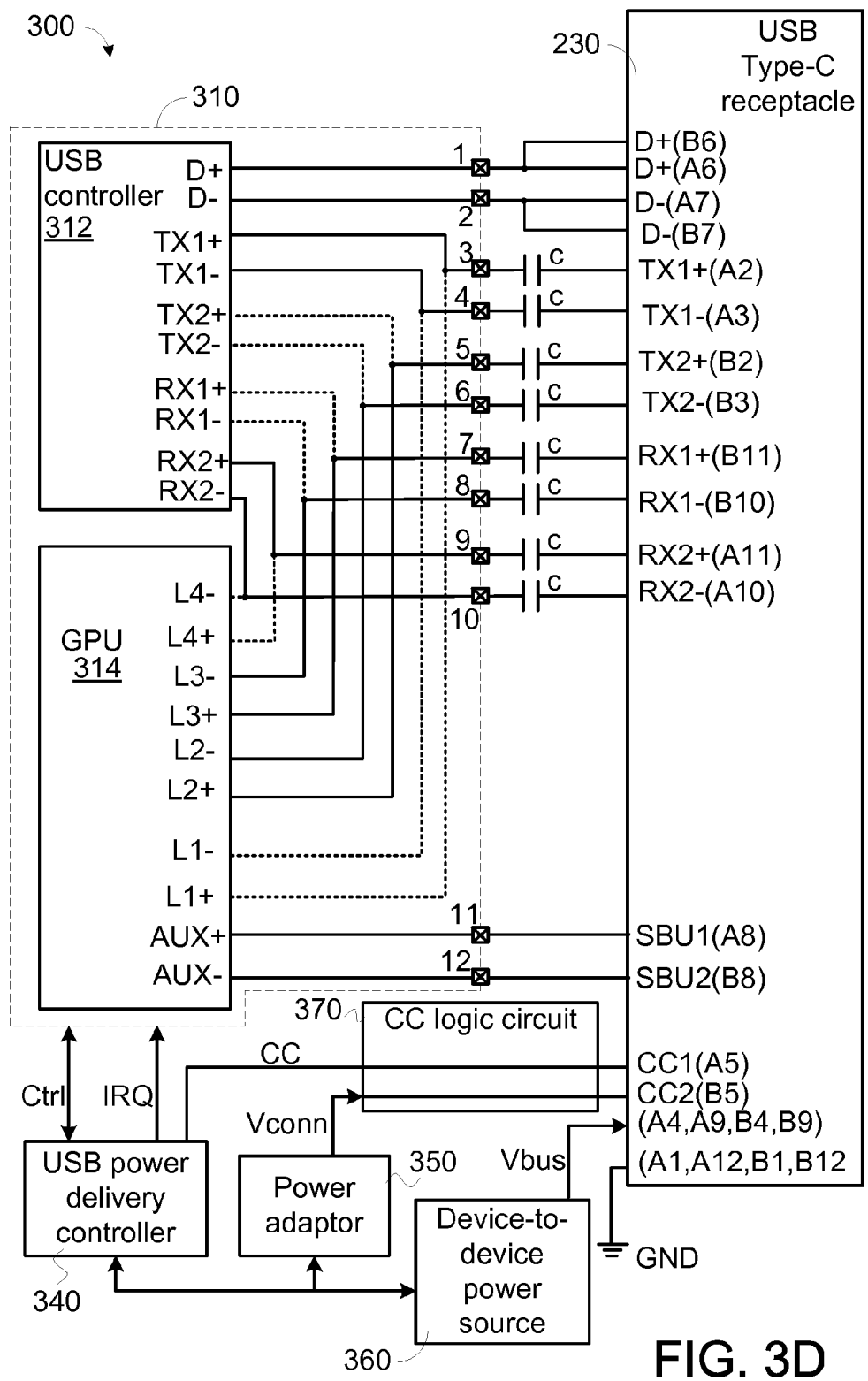

FIG. 3D schematically illustrates the architecture of the second system 300 in a third operation mode according to an embodiment of the invention. For example, a display device is plugged into the USB Type-C receptacle 230. According to the configuration channel signal CC, the second system 300 realizes that the display device is plugged into the USB Type-C receptacle 230. If only portions of the lanes need to be used, the second transmitting differential pair (TX2+ and TX2−) and the first receiving differential pair (RX1+ and RX1−) of the USB controller 312 are inactivated, and the first lane differential pair (L1+ and L1−) and the fourth lane differential pair (L4+ and L4−) of the graphics processing unit 314 are inactivated.

Under this circumstance, the A2 pin and the A3 pin of the USB Type-C receptacle 230 are coupled with the first transmitting differential pair (TX1+ and TX1) of the USB controller 312 through the corresponding capacitors; the A11 pin and the A10 pin of the USB Type-C receptacle 230 are coupled with the second receiving differential pair (RX2+ and RX2−) of the USB controller 312 through the corresponding capacitors; the B11 pin and the B10 pin of the USB Type-C receptacle 230 are coupled with the third lane differential pair (L3+ and L3−) of the graphics processing unit 314 through the corresponding capacitors c; and the B2 pin and the B3 pin of the USB Type-C receptacle 230 are coupled with the second lane differential pair (L2+ and L2−) of the graphics processing unit 314 through the corresponding capacitors c. Moreover, the A8 pin and the B8 pin of the USB Type-C receptacle 230 are connected with the auxiliary differential pair (AUX+ and AUX−) of the graphics processing unit 314.

Consequently, the DisplayPort AV signals are outputted to the display device through the two lanes of the graphics processing unit 314. Moreover, the display device is in communication with the USB controller 312 through the first transmitting differential pair (TX1+ and TX1) and the second transmitting differential pair (TX2+ and TX2−).

In comparison with the first system 200, the multi-function control circuit 310 of the second system 300 on the printed circuit board has only twelve pins for inputting and outputting signals. Moreover, the second system 300 does not require the high speed switch. Consequently, the cost of the second system 300 is reduced, and the area of the printed circuit board is effectively reduced.

According to the specifications, the pin corresponding to the single directional output signal has to be serially connected with the capacitor c and the capacitance value of the capacitor c is between 75 nF and 275 nF, such as 100 nF. Furthermore, the pin corresponding to the single directional input signal and the pin corresponding to the bidirectional signal do not need to be serially connected with the capacitors. In the second system 300, the first receiving differential pair (RX1+ and RX1−) and the second receiving differential pair (RX2+ and RX2−) are also coupled with the corresponding capacitors c. In the worst situation, the signal distortion problem may occur, and thus the receiver of the USB controller 312 may abnormally work. Hereinafter, two examples of the USB controller 312 will be illustrated with reference to FIGS. 4A and 4B.

Figure 4A:
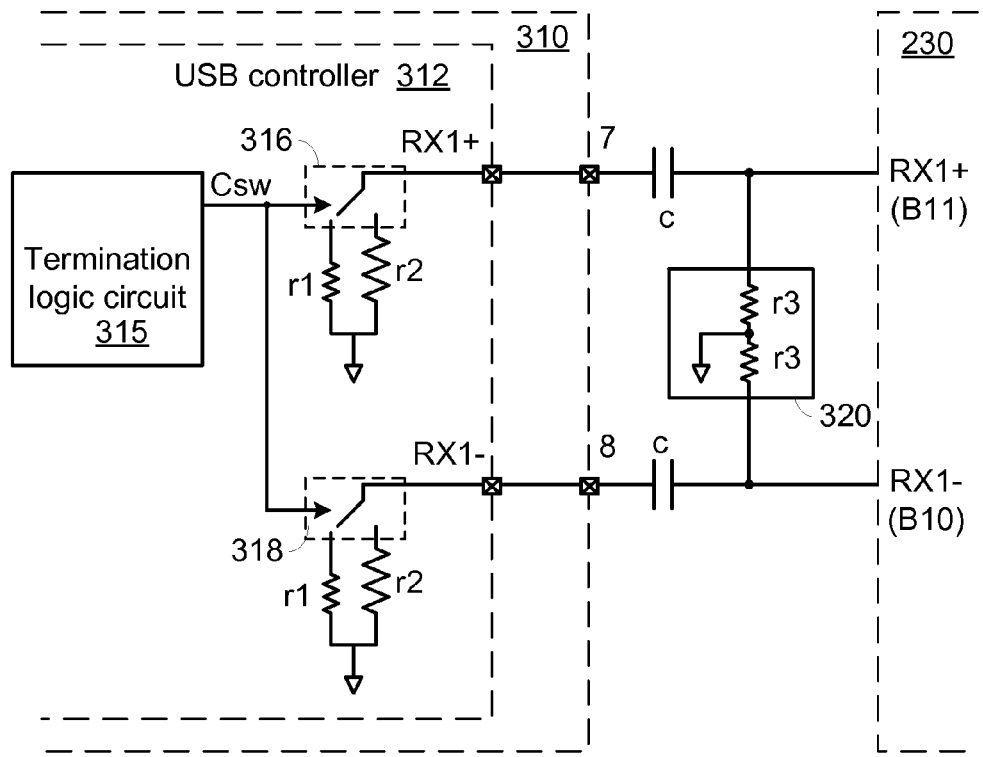
FIG. 4A is a schematic circuit diagram illustrating a portion of an exemplary USB controller of the second system of the invention.

FIG. 4A is a schematic circuit diagram illustrating a portion of an exemplary USB controller 312 of the second system 300 of the invention. For clarification and brevity, only the first receiving differential pair (RX1+ and RX1−) of the USB controller 312 is shown in the drawing. The similar circuit can be applied to the second receiving differential pair (RX2+ and RX2−) of the USB controller 312, and is not redundantly described herein.

Since the first receiving differential pair (RX1+ and RX1−) is serially connected with the corresponding capacitors, the equivalent capacitance is reduced. Under this circumstance, the time constant RC is reduced. In this embodiment, the receiver of the USB controller 312 is equipped with a termination logic circuit 315 for changing the resistance values of terminal resistors so as to change the RC constant.

As shown in FIG. 4A, the termination logic circuit 315 of the USB controller 312 generates a switching signal Csw to a switching circuit. The switch circuit comprises two switching elements 316 and 318. In a normal working state, the switching elements 316 and 318 are connected with a first resistor r1 in response to the switching signal Csw, and thus the first receiving differential pair (RX1+ and RX1−) is connected with the first resistor r1. In a triggering state, the switching elements 316 and 318 are connected with a second resistor r2 in response to the switching signal Csw.

According to the specifications, the resistance value of the terminal resistor is about 50 ohms. In this embodiment, the resistance value of the first resistor r1 is smaller than the resistance value of the second resistor r2. For example, the resistance value of the first resistor r1 is 50 ohms, and the resistance value of the second resistor r2 is 100 ohms.

Moreover, while the multi-function control circuit 310 is powered on or reset, a device is plugged into the USB Type-C receptacle 230, a device is detached from the USB Type-C receptacle 230 or the first receiving differential pair (RX1+ and RX1−) is in a signal silent condition, the USB controller 312 is in the triggering state. Under this circumstance, the switching elements 316 and 318 are connected with the second resistor r2 in response to the switching signal Csw.

On the other hand, if the signal in the first receiving differential pair (RX1+ and RX1−) can be successfully detected, the USB controller 312 is in the normal working state. Under this circumstance, the switching elements 316 and 318 are connected with the second resistor r1 in response to the switching signal Csw.

Since the first receiving differential pair (RX1+ and RX1−) is connected with the second resistor r2 in the triggering state, the time constant RC is increased. Under this circumstance, the signal in the first receiving differential pair (RX1+ and RX1−) is not suffered from distortion, so that the signal is detected easily. After the signal in the first receiving differential pair (RX1+ and RX1−) is detected, the first receiving differential pair (RX1+ and RX1−) is connected with the first resistor r1. Consequently, the USB controller 312 is in the normal working state.

Moreover, the second system 300 further comprises a common mode voltage control circuit 320. The common mode voltage control circuit 320 is arranged between two capacitors for stabilizing the common mode voltage. In this embodiment, the common mode voltage control circuit 320 comprises two third resistors r3. The two third resistors r3 are serially connected between the two capacitors. The node between the two third resistors r3 is connected to the ground voltage.

Figure 4B:
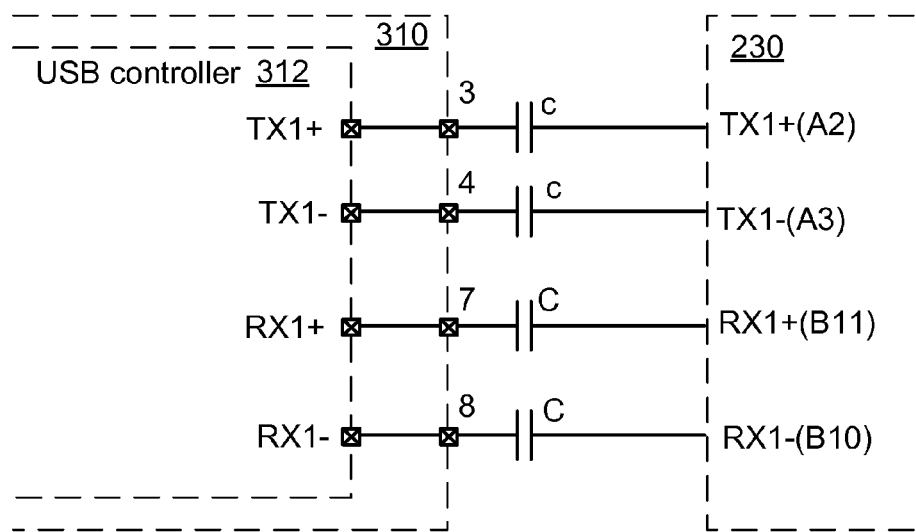
FIG. 4B is a schematic circuit diagram illustrating a portion of another exemplary USB controller of the second system of the invention.

FIG. 4B is a schematic circuit diagram illustrating a portion of an exemplary USB controller 312 of the second system 300 of the invention. For clarification and brevity, only the first receiving differential pair (RX1+ and RX1−) and the first transmitting differential pair (TX1+ and TX1) of the USB controller 312 are shown in the drawing. The similar circuit can be applied to the second receiving differential pair (RX2+ and RX2−) and the second transmitting differential pair (TX2+ and TX2−) of the USB controller 312, and is not redundantly described herein.

According to the specifications, the first transmitting differential pair (TX1+ and TX1) of the USB controller 312 of the multi-function control circuit 310 has to be serially connected with the 100 nF capacitors c. Moreover, the first receiving differential pair (RX1+ and RX1−) of the USB controller 312 of the multi-function control circuit 310 does not need to be connected with the capacitors. If the first receiving differential pair (RX1+ and RX1−) is serially connected with the capacitors c, the time constant RC is reduced. In the worst situation, the signal distortion problem may occur, and thus the signal cannot be successfully detected.

Moreover, if the layout trace of the first receiving differential pair (RX1+ and RX1−) on the printed circuit board has a lower equivalent capacitance value, the reduction of the time constant RC become more obvious. For solving this drawback, the first receiving differential pair (RX1+ and RX1−) is coupled with capacitors C with higher capacitance values. For example, the capacitance value of the capacitor C is 400 nF. Consequently, the reduction of the time constant RC of the first receiving differential pair (RX1+ and RX1−) is not obvious. Under this circumstance, the signal in the first receiving differential pair (RX1+ and RX1−) can be successfully detected.

FIGS. 5A, 5B, 5C and 5D schematically illustrate the architecture of a third system using a USB Type-C interface in different operation modes according to an embodiment of the invention. The third system 500 is mounted on a printed circuit board (PCB). Moreover, the third system 500 comprises a multi-function control circuit 510, a USB Type-C receptacle 230, a first path switching circuit (SW1) 516, a second path switching circuit (SW2) 518, a USB power delivery controller 340, a power adaptor 350, a device-to-device power source 360, a configuration channel logic circuit (CC logic circuit) 370 and plural capacitors c. The operations of the USB power delivery controller 340, the power adaptor 350, the device-to-device power source 360 and the configuration channel logic circuit 370 are identical to those of the second system 300, and are not redundantly described herein.

The A6 pin and the B6 pin of the USB Type-C receptacle 230 are connected with a first pin 1 of the multi-function control circuit 510. The A7 pin and the B7 pin of the USB Type-C receptacle 230 are connected with a second pin 2 of the multi-function control circuit 510. The A2 pin of the USB Type-C receptacle 230 is connected with a third pin 3 of the multi-function control circuit 510 through the corresponding capacitor c. The A3 pin of the USB Type-C receptacle 230 is connected with a fourth pin 4 of the multi-function control circuit 510 through the corresponding capacitor c. The B2 pin of the USB Type-C receptacle 230 is connected with a fifth pin 5 of the multi-function control circuit 510 through the corresponding capacitor c. The B3 pin of the USB Type-C receptacle 230 is connected with a sixth pin 6 of the multi-function control circuit 510 through the corresponding capacitor c. The A8 pin of the USB Type-C receptacle 230 is connected with a fifteenth pin 15 of the multi-function control circuit 510. The B8 pin of the USB Type-C receptacle 230 is connected with a sixteenth pin 16 of the multi-function control circuit 510. The B11 pin and the B10 pin of the USB Type-C receptacle 230 are connected with the first path switching circuit 516. The A11 pin and the A10 pin of the USB Type-C receptacle 230 are connected with the second path switching circuit 518.

Moreover, the first path switching circuit 516 is further connected with a seventh pin 7 and an eighth pin 8 of the multi-function control circuit 510, and coupled with an eleventh pin 11 and a twelfth pin 12 of the multi-function control circuit 510 through the corresponding capacitors c. The second path switching circuit 518 is further connected with a ninth pin 9 and a tenth pin 10 of the multi-function control circuit 510, and coupled with a thirteenth pin 13 and a fourteenth pin 14 of the multi-function control circuit 510 through the corresponding capacitors c.

The multi-function control circuit 510 comprises a USB controller 512 and a graphics processing unit (GPU) 514.

The USB controller 512 comprises a USB 2.0 data differential pair (D+ and D−), a first transmitting differential pair (TX1+ and TX1−), a second transmitting differential pair (TX2+ and TX2−), a first receiving differential pair (RX1+ and RX1−) and a second receiving differential pair (RX2+ and RX2−). The USB 2.0 data differential pair (D+ and D−) is connected with the first pin 1 and the second pin 2. The first transmitting differential pair (TX1+ and TX1) is connected with the third pin 3 and the fourth pin 4. The second transmitting differential pair (TX2+ and TX2−) is connected with the fifth pin 5 and the sixth pin 6. The first receiving differential pair (RX1+ and RX1−) is connected with the seventh pin 7 and the eighth pin 8. The second receiving differential pair (RX2+ and RX2−) is connected with the ninth pin 9 and the tenth pin 10.

The graphics processing unit 514 comprises an auxiliary differential pair (AUX+ and AUX−) and four lanes. The four lanes are four lane differential pairs (L1+ and L1−, L2+ and L2−, L3+ and L3− and L4+ and L4−). The first lane differential pair (L1+ and L1−) is connected with the eleventh pin 11 and the twelfth pin 12. The second lane differential pair (L2+ and L2−) is connected with the thirteenth pin 13 and the fourteenth pin 14. The third lane differential pair (L3+ and L3−) is connected with the third pin 3 and the fourth pin 4. The fourth lane differential pair (L4+ and L4−) is connected with the fifth pin 5 and the sixth pin 6. The auxiliary differential pair (AUX+ and AUX−) is connected with the fifteenth pin 15 and the sixteenth pin 16.

Figure 5A:
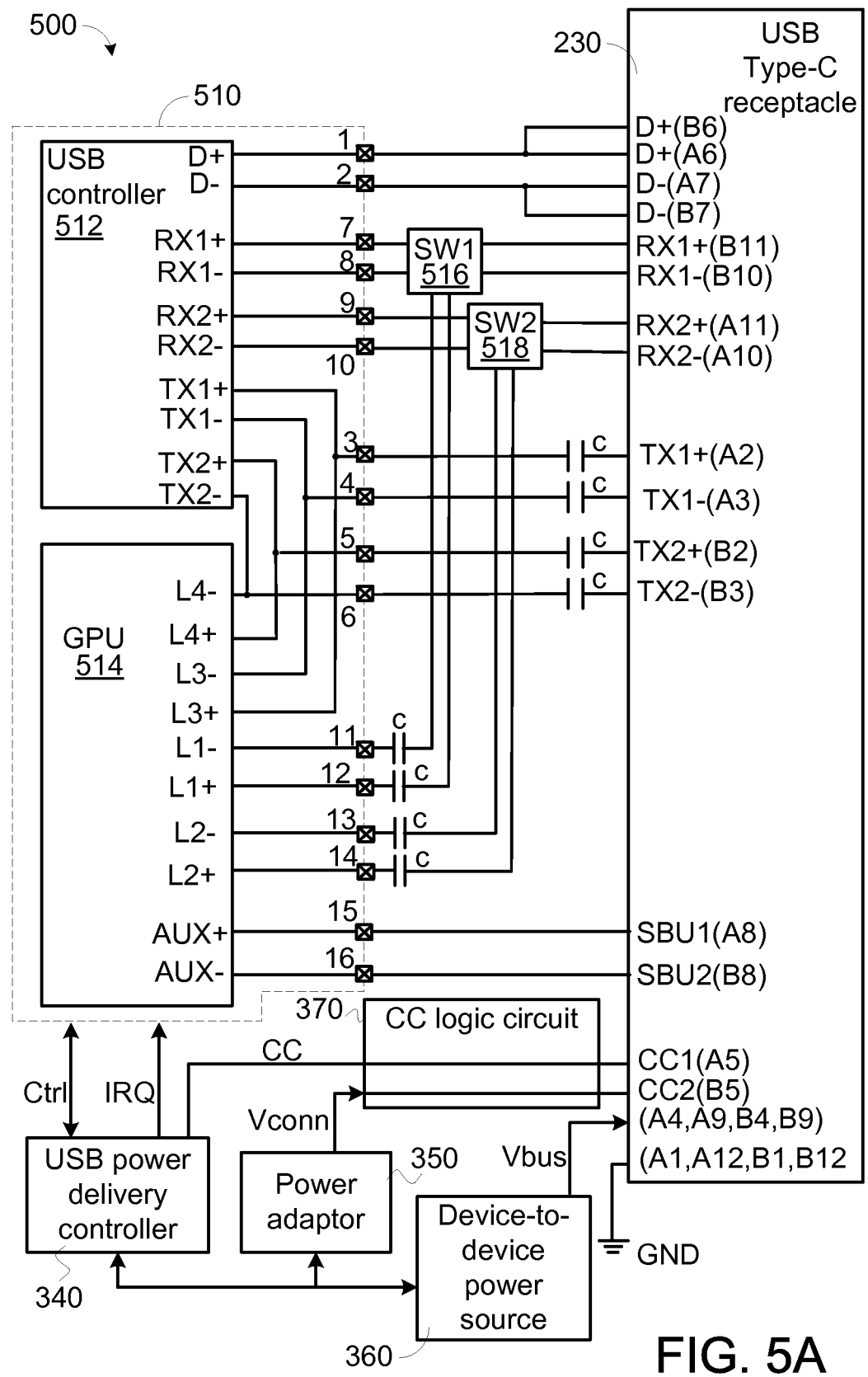
FIGS. 5A, 5B, 5C and 5D schematically illustrate the architecture of a third system using a USB Type-C interface in different operation modes according to an embodiment of the invention.
Figure 5B:
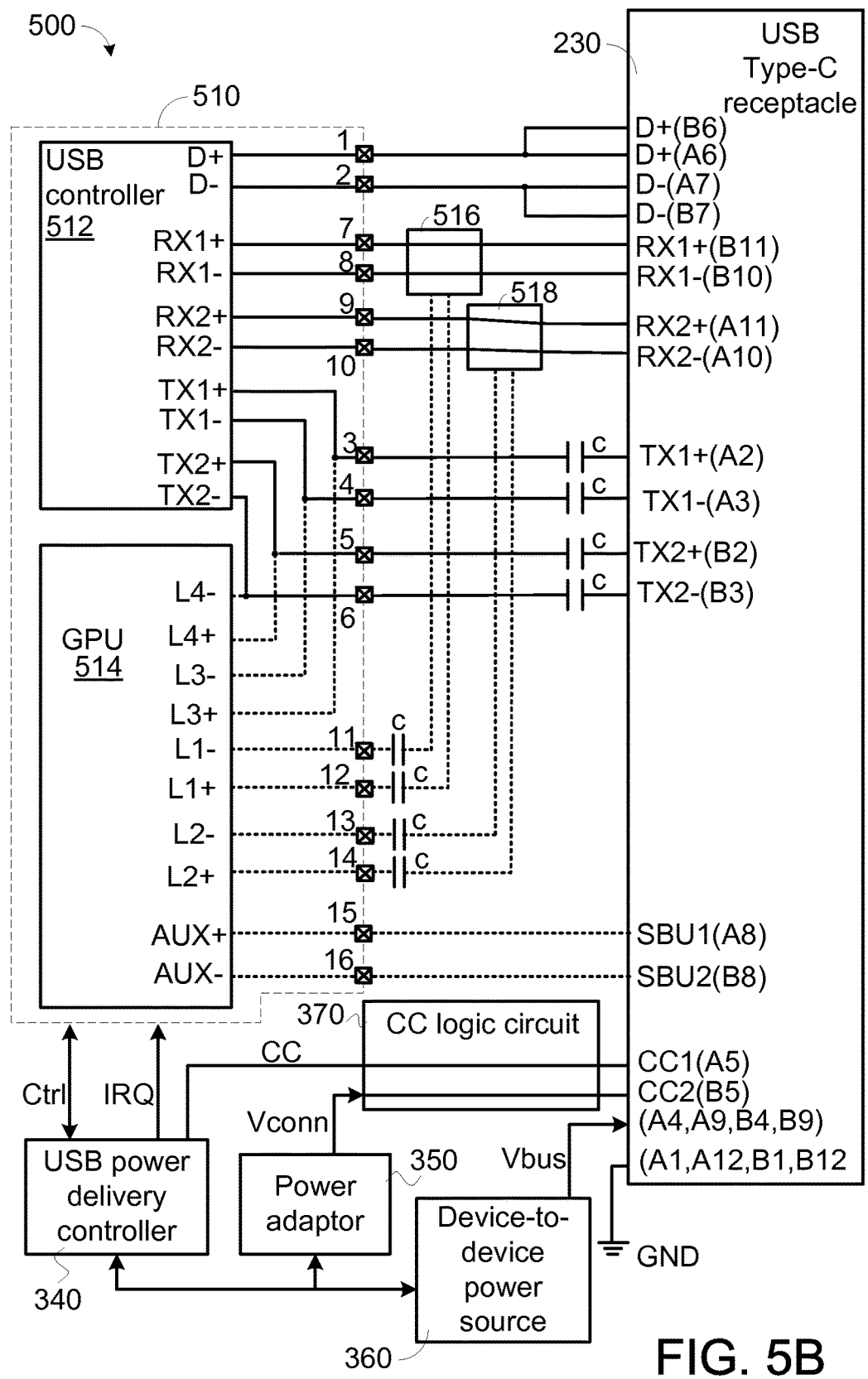

FIG. 5B schematically illustrates the architecture of the third system in a first operation mode according to an embodiment of the invention. For example, a USB device is plugged into the USB Type-C receptacle 230. After the third system 500 realizes that the USB device is plugged into the USB Type-C receptacle 230 according to the configuration channel signal CC, the graphics processing unit 514 does not generate any output signal. Under this circumstance, the first receiving differential pair (RX1+ and RX1−) and the second receiving differential pair (RX2+ and RX2−) are connected with the USB Type-C receptacle 230 through the first path switching circuit 516 and the second path switching circuit 518.

As shown in FIG. 5B, the first transmitting differential pair (TX1+ and TX1) and the second transmitting differential pair (TX2+ and TX2−) of the USB controller 512 are coupled with the corresponding pins of the USB Type-C receptacle 230 through the corresponding capacitors c, and the first receiving differential pair (RX1+ and RX1−) and the second receiving differential pair (RX2+ and RX2−) of the USB controller 512 are connected with the corresponding pins of the USB Type-C receptacle 230 through the first path switching circuit 516 and the second path switching circuit 518. Consequently, the USB device can receive all signals from the USB controller 512. Moreover, the first path switching circuit 516 and the second path switching circuit 518 are controlled by the multi-function control circuit 510 or the configuration channel logic circuit 370. The detailed descriptions thereof are omitted herein.

Figure 5C:
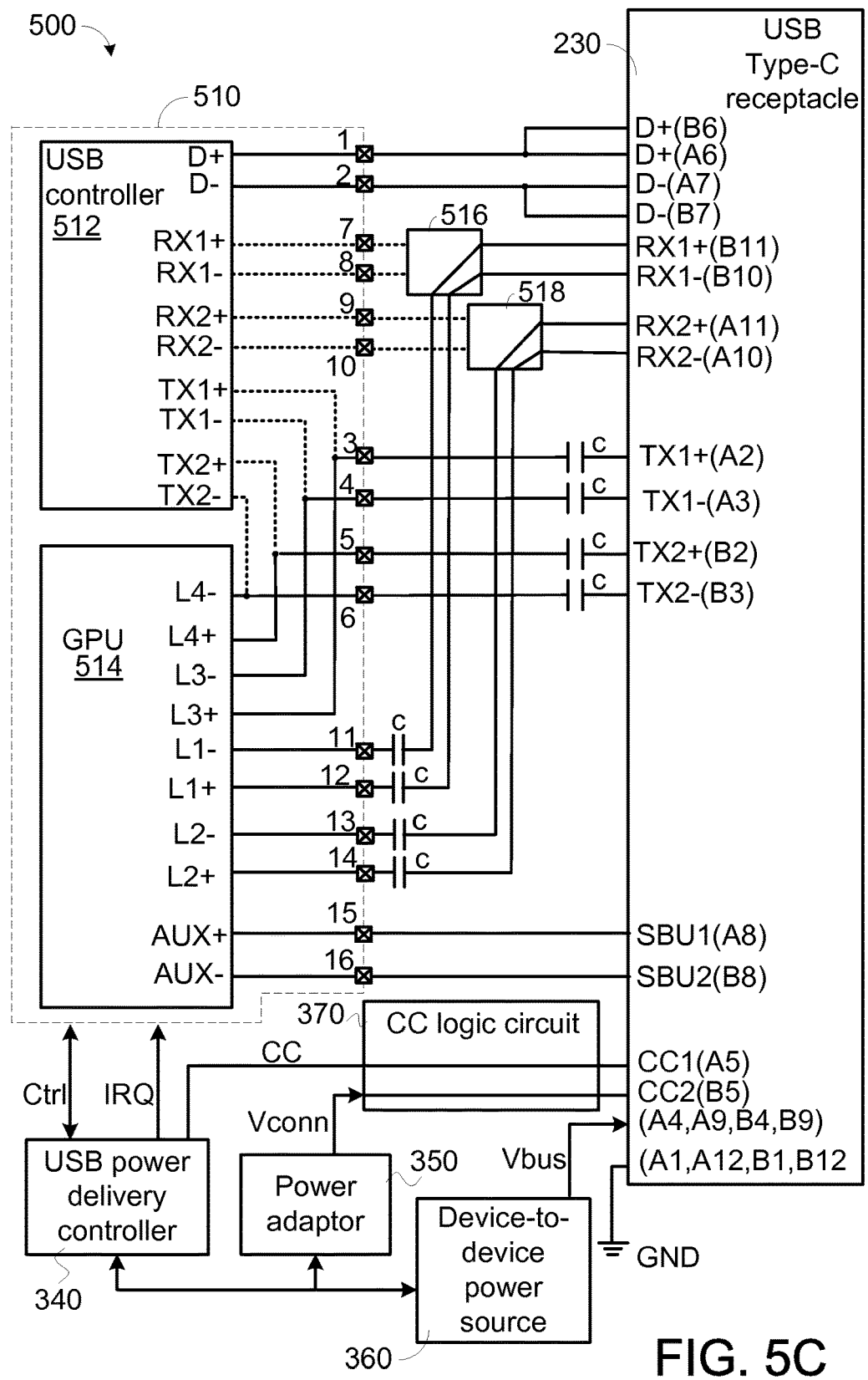

FIG. 5C schematically illustrates the architecture of the third system in a second operation mode according to an embodiment of the invention. For example, a display device is plugged into the USB Type-C receptacle 230. According to the configuration channel signal CC, the third system 500 realizes that the display device is plugged into the USB Type-C receptacle 230. If all lanes need to be used, the USB controller 512 does not generate any output signal. Under this circumstance, the first lane differential pair (L1+ and L1−) and the second lane differential pair (L2+ and L2−) of the graphics processing unit 514 are coupled with the USB Type-C receptacle 230 through the first path switching circuit 516 and the second path switching circuit 518 and the corresponding capacitors c.

As shown in FIG. 5C, the B11 pin and the B10 pin of the USB Type-C receptacle 230 are coupled with the first lane differential pair (L1+ and L1−) of the graphics processing unit 514 through the corresponding capacitors c; the B2 pin and the B3 pin of the USB Type-C receptacle 230 are coupled with the fourth lane differential pair (L4+ and L4−) of the graphics processing unit 514 through the corresponding capacitors c; the A11 pin and the A10 pin of the USB Type-C receptacle 230 are coupled with the second lane differential pair (L2+ and L2−) of the graphics processing unit 514 through the corresponding capacitors c; and the A2 pin and the A3 pin of the USB Type-C receptacle 230 are coupled with the third lane differential pair (L3+ and L3−) of the graphics processing unit 514 through the corresponding capacitors c. Moreover, the A8 pin and the B8 pin of the USB Type-C receptacle 230 are connected with the auxiliary differential pair (AUX+ and AUX−) of the graphics processing unit 514. Consequently, the DisplayPort AV signals are outputted to the display device through the four lanes of the graphics processing unit 514.

Figure 5D:
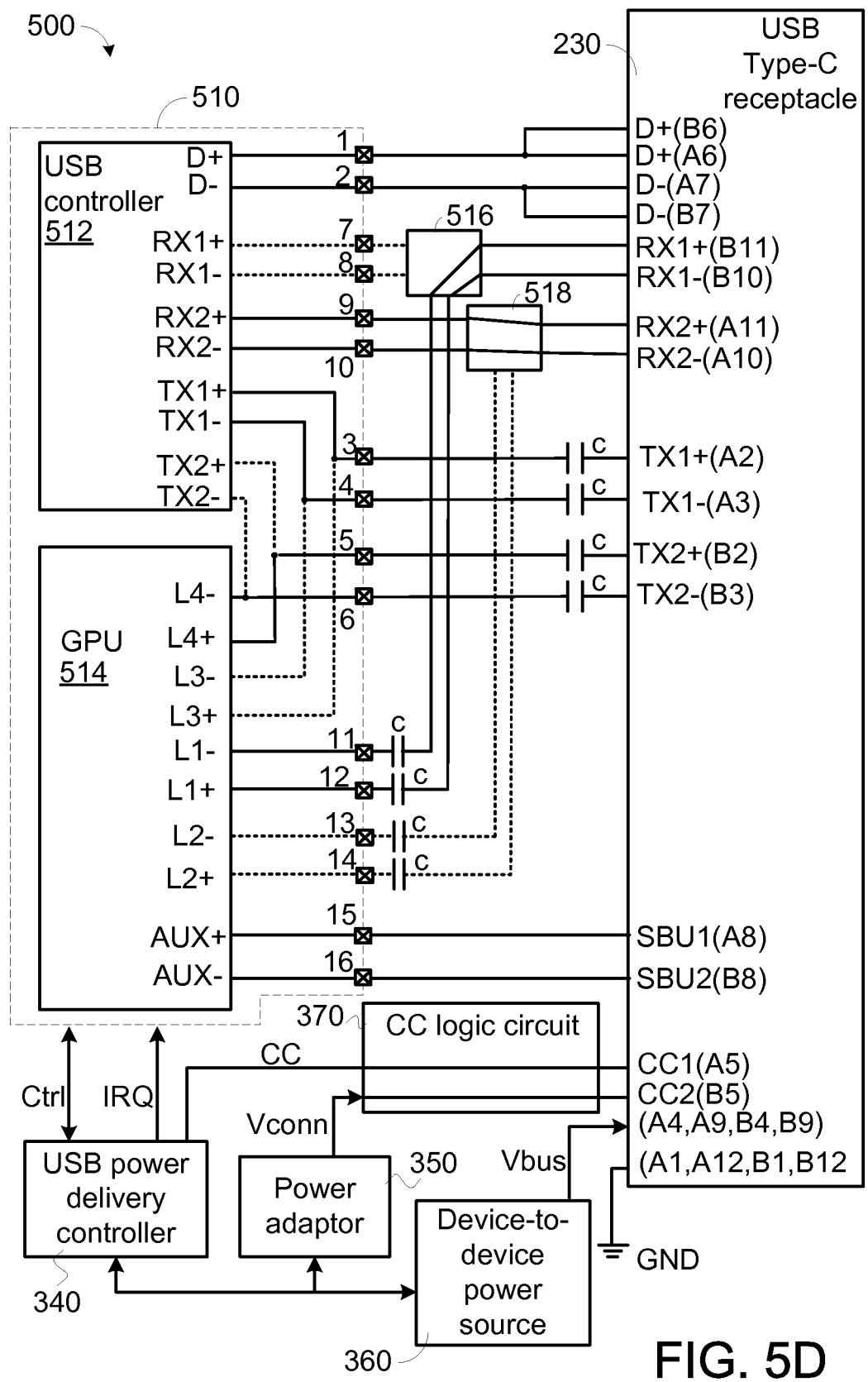

FIG. 5D schematically illustrates the architecture of the third system in a third operation mode according to an embodiment of the invention. For example, a display device is plugged into the USB Type-C receptacle 230. According to the configuration channel signal CC, the third system 500 realizes that the display device is plugged into the USB Type-C receptacle 230. If only portions of the lanes need to be used, the second transmitting differential pair (TX2+ and TX2−) and the first receiving differential pair (RX1+ and RX1−) of the USB controller 512 are inactivated, and the second lane differential pair (L2+ and L2−) and the third lane differential pair (L3+ and L3−) of the graphics processing unit 514 are inactivated. Under this circumstance, the first lane differential pair (L1+ and L1−) is coupled with the USB Type-C receptacle 230 through the first path switching circuit 516 and the corresponding capacitors c; and the second receiving differential pair (RX2+ and RX2−) is connected with the USB Type-C receptacle 230 through the second path switching circuit 518.

As shown in FIG. 5D, the A2 pin and the A3 pin of the USB Type-C receptacle 230 are coupled with the first transmitting differential pair (TX1+ and TX1) of the USB controller 512 through the corresponding capacitors c; the A11 pin and the A10 pin are connected with the second receiving differential pair (RX2+ and RX2−); the B11 pin and the B10 pin are coupled with the first lane differential pair (L1+ and L1−) through the corresponding capacitors c; and the B2 pin and the B3 pin are coupled with the fourth lane differential pair (L4+ and L4−) of the graphics processing unit 514 through the corresponding capacitors c. Moreover, the A8 pin and the B8 pin of the USB Type-C receptacle 230 are connected with the auxiliary differential pair (AUX+ and AUX−) of the graphics processing unit 514.

Consequently, the DisplayPort AV signals are outputted to the display device through the two lanes of the graphics processing unit 514. Moreover, the display device is in communication with the USB controller 512 through the first transmitting differential pair (TX1+ and TX1) and the second transmitting differential pair (TX2+ and TX2−).

In comparison with the first system 200, the multi-function control circuit 510 of the third system 500 on the printed circuit board has only sixteen pins for inputting and outputting signals. Moreover, the third system 500 is not equipped with the high speed switch. Consequently, the cost of the third system 500 is reduced, and the area of the printed circuit board is effectively reduced.

In the above embodiments, the USB power delivery controller 340, the power adaptor 350, the device-to-device power source 360 and the configuration channel logic circuit 370 are individual circuits or control into the multi-function control circuit. Moreover, the sequence of the four lane differential pairs of the graphics processing unit is not restricted.

From the above illustration, the invention provides a system using a USB Type-C interface. This system not only transmits the normal USB signal but also supports a DisplayPort Alternate Mode. Moreover, due to the novel pin arrangement of the multi-function control circuit, the cost of the overall system is reduced, and the area of the printed circuit board is effectively reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A system using a USB Type-C interface, the system comprising:
   a multi-function control circuit mounted on a printed circuit board, and comprising:
   a USB controller comprising a data differential pair, a first transmitting differential pair, a second transmitting differential pair, a first receiving differential pair, a second receiving differential pair, a switching circuit connected with the first receiving differential pair and a termination logic circuit generating a switching signal to the switching circuit, wherein the data differential pair is connected with a first pin and a second pin of the multi-function control circuit, the first transmitting differential pair is connected with a third pin and a fourth pin of the multi-function control circuit, the second transmitting differential pair is connected with a fifth pin and a sixth pin of the multi-function control circuit, the first receiving differential pair is connected with a seventh pin and an eighth pin of the multi-function control circuit, and the second receiving differential pair is connected with a ninth pin and a tenth pin of the multi-function control circuit, wherein when the switching signal indicates that the USB controller is in a normal working state, the first receiving differential pair is connected with a first resistor through the switching circuit, wherein when the switching signal indicates that the USB controller is in a triggering state, the first receiving differential pair is connected with a second resistor through the switching circuit, wherein a resistance value of the second resistor is larger than a resistance value of the first resistor; and
   a graphics processing unit comprising a first lane differential pair, a second lane differential pair, a third lane differential pair, a fourth lane differential pair and an auxiliary differential pair, wherein the first lane differential pair is connected with the third pin and the fourth pin of the multi-function control circuit, the second lane differential pair is connected with the fifth pin and the sixth pin of the multi-function control circuit, the third lane differential pair is connected with the seventh pin and the eighth pin of the multi-function control circuit, the fourth lane differential pair is connected with the ninth pin and the tenth pin of the multi-function control circuit, and the auxiliary differential pair is connected with an eleventh pin and a twelfth pin of the multi-function control circuit; and
   a USB Type-C receptacle mounted on a printed circuit board, and comprising plural pins, wherein an A1 pin is connected with a ground voltage, an A2 pin is coupled with the third pin through a first capacitor, an A3 pin is coupled with the fourth pin through a second capacitor, an A4 pin is connected with a bus voltage, an A6 pin is connected with the first pin, an A7 pin is connected with the second pin, an A9 pin is connected with the bus voltage, an A10 pin is coupled with the tenth pin through a third capacitor, an A11 pin is coupled with the ninth pin through a fourth capacitor, an A12 pin is connected with the ground voltage, a B1 pin is connected with the ground voltage, a B2 pin is coupled with the fifth pin through a fifth capacitor, a B3 pin is coupled with the sixth pin through a sixth capacitor, a B4 pin is connected with the bus voltage, a B6 pin is connected with the first pin, a B7 pin is connected with the second pin, a B9 pin is connected with the bus voltage, a B10 pin is connected with the eighth pin through a seventh capacitor, a B11 pin is connected with the seventh pin through an eighth capacitor, and a B12 pin is connected with the ground voltage, wherein an A8 pin is connected with the eleventh pin, a B8 pin is connected with the twelfth pin, one of an A5 pin and a B5 pin provides a configuration channel signal, and the other one of the A5 pin and the B5 pin receives a connection voltage.

2. The system as claimed in claim 1, further comprising:
   a configuration channel logic circuit connected with the A5 pin and the B5 pin;
   a device-to-device power source providing the bus voltage to A4 pin, the A9 pin, the B4 pin and the B9 pin;
   a power adaptor connected with the configuration channel logic circuit, and providing the connection voltage to one of the A5 pin and the B5 pin; and
   a USB power delivery controller connected with the configuration channel logic circuit, the power adaptor, the device-to-device power source and the multi-function control circuit, wherein the other one of the A5 pin and the B5 pin provides the configuration channel signal to the USB power delivery controller.

3. The system as claimed in claim 1, wherein when the configuration channel signal indicates that the system is operated in a first operation mode, the graphics processing unit is disabled.

4. The system as claimed in claim 3, wherein when the configuration channel signal indicates that the system is operated in a second operation mode, the USB controller is disabled.

5. The system as claimed in claim 4, wherein when the configuration channel signal indicates that the system is operated in a third operation mode, the second transmitting differential pair and the first receiving differential pair of the USB controller are inactivated, and the first lane differential pair and the fourth lane differential pair of the graphics processing unit are inactivated.

6. The system as claimed in claim 1, wherein each of the first capacitor, the second capacitor, the fifth capacitor and the sixth capacitor has a first capacitance value, and each of the third capacitor, the fourth capacitor, the seventh capacitor and the eighth capacitor has a second capacitance value, wherein the second capacitance value is larger than the first capacitance value.

7. The system as claimed in claim 1, wherein while the multi-function control circuit is powered on or reset, a device is plugged into or detached from the USB Type-C receptacle or the first receiving differential pair is in a signal silent condition, the USB controller is in the triggering state.

8. The system as claimed in claim 1, wherein when a signal in the first receiving differential pair is successfully detected, the USB controller is in the normal working state.

9. A multi-function control circuit for a USB Type-C interface, the multi-function control circuit comprising:
   a USB controller comprising a first plurality of differential pairs, a data differential pair directly connected with a first pin and a second pin of the multi-function control circuit, a switching circuit and a termination logic circuit generating a switching signal to the switching circuit,
   wherein the first plurality of differential pairs comprises: a first transmitting differential pair, a second transmitting differential pair, a first receiving differential pair connected to the switching circuit and a second receiving differential pair,
   wherein the first transmitting differential pair is directly connected with a third pin and a fourth pin of the multi-function control circuit, the second transmitting differential pair is directly connected with a fifth pin and a sixth pin of the multi-function control circuit, the first receiving differential pair is directly connected with a seventh pin and an eighth pin of the multi-function control circuit, and the second receiving differential pair is directly connected with a ninth pin and a tenth pin of the multi-function control circuit,
   wherein when the switching signal indicates that the USB controller is in a normal working state, the first receiving differential pair is connected with a first resistor through the switching circuit, wherein when the switching signal indicates that the USB controller is in a triggering state, the first receiving differential pair is connected with a second resistor through the switching circuit, wherein a resistance value of the second resistor is larger than a resistance value of the first resistor; and
   a graphics processing unit comprising a second plurality of differential pairs and an auxiliary differential pair directly connected with an eleventh pin and a twelfth pin of the multi-function control circuit, wherein the second plurality of differential pairs comprises: a first lane differential pair, a second lane differential pair, a third lane differential pair, and a fourth lane differential pair,
   wherein the first lane differential pair is directly connected with the third pin and the fourth pin of the multi-function control circuit, the second lane differential pair is directly connected with the fifth pin and the sixth pin of the multi-function control circuit, the third lane differential pair is directly connected with the seventh pin and the eighth pin of the multi-function control circuit, and the fourth lane differential pair is directly connected with the ninth pin and the tenth pin of the multi-function control circuit.

10. The multi-function control circuit as claimed in claim 9, wherein while the multi-function control circuit is powered on or reset, a device is plugged into or detached from the USB Type-C receptacle or the first receiving differential pair is in a signal silent condition, the USB controller is in the triggering state.

11. The multi-function control circuit as claimed in claim 10, wherein when a signal in the first receiving differential pair is successfully detected, the USB controller is in the normal working state.

* * * * *